United States Patent [19]

Genack et al.

[11] Patent Number: 4,619,528
[45] Date of Patent: Oct. 28, 1986

[54] PHASE RESOLVED MODULATION RAMAN SPECTROMETER

[75] Inventors: Azriel Z. Genack, New York, N.Y.; Bruce N. Perry, Flemington, N.J.

[73] Assignee: Exxon Research and Engineering Co., Florham Park, N.J.

[21] Appl. No.: 574,130

[22] Filed: Jan. 26, 1984

[51] Int. Cl.[4] .............................................. G01J 3/44
[52] U.S. Cl. .................................................... 356/301
[58] Field of Search ......................................... 356/301

[56] References Cited

U.S. PATENT DOCUMENTS 3,807,862  4/1974  Hatzenbuhler ...................... 356/301

OTHER PUBLICATIONS

Van Duyne et al., Anal. Chem., V. 46, No. 2, pp. 213–222, Feb. 1974.
Yaney, J. Opt. Soc. Am., V. 62, No. 11, pp. 1297–1303, Nov. 1972.
Levenson et al., Appl. Phys., V. 19, No. 1, pp. 1–17, May 1979.
Spencer et al., Annals. N.Y. Acad. Sci., V. 158, pp. 361–376, 1969.
Gaviola, Zeitschrift fur Physik, V. 42, p. 853, 1927.

Primary Examiner—F. L. Evans
Assistant Examiner—Joel L. Harringa
Attorney, Agent, or Firm—Ronald D. Hantman

[57] ABSTRACT

A system for measuring fluorescence-suppressed Raman Scattering using intensity-modulated laser excitation, electro-optic demodulation of the emitted and scattered light, and a means to adjust the phase of optical transmission of the demodulator relative to the laser modulation.

7 Claims, 8 Drawing Figures

PHASE RESOLVED MODULATION RAMAN SPECTROMETER

BACKGROUND OF THE INVENTION

This invention relates to Raman Spectrometers. In particular, it relates to phase sensitive detection of Raman scattering.

Raman spectroscopy (RS) is a useful tool for studying the structure of solids. However, Raman scattering (RS) is often swamped by fluorescence from resonantly excited molecules under study or from other sample constituents including impurities. In particular cases, fluorescence may be reduced by judicious choice of exciting frequency, careful sample preparation or the introduction of fluorescence quenching molecules or surfaces. However, in order to fully exploit resonant RS and to study inhomogeneous systems such as, for example, in vivo biological samples or molecules on dispersed supports, a general means of fluorescence suppression is required. Numerous approaches using both stimulated and spontaneous RS have been developed to increase the contrast between RS and fluorescence for particular samples.

Nonlinear optical techniques such as coherent anti-stokes RS (CARS) or Raman gain spectroscopy in which the frequency difference between two exciting lasers is scanned have yielded fluorescent free Raman spectra of transparent samples. Interference due to non-resonant terms often complicate the CARS spectrum, but these can be suppressed using Raman-induced Kerr effect spectroscopy (RIKES). A host of linear methods which separate RS from fluorescence by their different characteristics in the frequency or time domain have also been developed which are applicable even to opaque or inhomogeneous samples. Modulation of the detected optical frequency can separate broad fluorescence from sharper RS features. The more effective method of modulation of the excitation frequency distinguishes between fluorescence and RS in cases where the fluorescence spectrum is independent of excitation frequency, since the frequency of RS tracks the excitation frequency. This method fails, however, when a fraction of the fluorescence is emitted before the excitation is thermalized. In this case "hot luminescence" also tracks the exciting frequency to some extent. In addition, methods which exploit the different temporal response of RS and fluorescence to pulsed excitation have been developed to suppress fluorescence. Since RS is prompt, it is detected in a time which is the convolution of the laser pulse width and the detector response time. Fluorescence can be discriminated against if the detection window overlapping the laser probe is much shorter than the fluorescence decay time. Pulsed laser techniques are most effective in discriminating against fluorescence with lifetimes considerably greater than the response time of photomultiplier tubes of $\geq 0.3$ nsec.

Another technique detects the modulated component of emission from a mechanically chopped laser beam using a lock-in detector following a photomultiplier tube. This method has been used to detect RS from ruby while suppressing fluorescence with a lifetime of about 5 msec. RS only occurs when the beam is chopped on while the depth of modulation of fluorescence is reduced when the period of chopping is less than 5 msec. The shortest luminescent lifetime that can be suppressed to some degree by this technique is limited by the chopping period of the laser beam, or the response time of the photomultiplier tube or lock-in detector.

The present invention includes the use of electro-optic demodulation of emission induced by an intensity modulated laser to null fluorescence. Phase sensitive detection can separate fluorescence from RS since the phase of the fluorescence lags the phase of the excitation, while RS, which is a prompt scattering process, is in phase with the excitation. Particularly when extended to higher frequencies the method of phase-resolved modulation RS can be used quite generally to suppress fluorescence even in samples with subnanosecond decay times as well as to measure ultrashort optical phenomena. Since fluorescence is suppressed by subtracting spectra in which fluorescence is present rather than by enhancing RS or rejecting fluorescence altogether, statistical noise arising from the fluorescence background is retained in the difference spectrum. This noise can be reduced by signal averaging.

It is demonstrated here that a phase resolved optical modulation approach can be used to observe RS in the presence of much more intense fluorescence. Using 30 MHz modulation, fluorescense with a lifetime of 8.5 nsec. is rejected. An extension of this approach to microwave frequencies will make it possible to suppress fluorescence with lifetimes as short as 50 psec. Shorter-lived species have low quantum yields for fluorescence and generally do not contribute significantly to fluorescence.

SUMMARY OF THE INVENTION

The present invention is a system which includes optical phase-sensitive detection of emission from a sample which is excited by an intensity modulated laser which is used to obtain fluorescence-free Raman spectra. Phase resolution is used to separate prompt Raman scattering (RS) which is in phase with the modulated laser, from fluorescence which lags the excitation. This is accomplished by passng the emission excited by a modulated laser beam through an optical intensity second modulator with its phase adjustable relative to the laser modulation. The fluorescence background is nulled by substracting spectra detected at $\phi - \phi_o$ from spectra detected at $\phi + \phi_o$, where the fluorescence lags the Raman radiation by the angle $\phi$ and $\phi_o$ is an arbitrary phase. In a preferred embodiment, $\phi_o$ is $\pi/2$. Since the light is demodulated before striking the photodetector a slow detector unresponsive to the modulation frequency and an optical multichannel analyzer (OMA) can be utilized.

In a preferred embodiment, the modulated laser radiation is obtained by passing a CW laser beam through a first optical modulator. Either modulator may be an electro or acousto optical modulator. (Such modulators are referred to as EO modulators and AO modulators, respectively).

Statistical noise associated with fluorescence is retained in the resultant spectrum. Very short lived and multicomponent fluorescence may be discriminated against by modulating at high frequencies using microwave EO modulators to reduce the modulation depth of the fluorescence and to force the phase shift of the fluorescence towards 90°. High frequency phase-sensitive modulation RS can be used to observe resonant RS from fluorescing species and to study inhomogeneous samples containing fluorescing impurities. The use of optical phase-sensitive detection in conjunction with microwave EO modulators may also be used to resolve ultra-short optical phenomena.

BRIEF DESCRIPTION OF THE DRAWINGS

FIG. 3 shows the results of the application of phase-resolved RS to $3 \times 10^{-4}$ M 2,2'-bipyridine ruthenous dichloride hexahydrate in a 70-30 mixture of cyclohexane and ethanol. FIG. 3b shows the CH stretching region of the spectrum by subtracting the out of phase spectrum from the in phase spectrum shown in FIG. 3a.

FIG. 4 shows the application of phase-resolved modulation RS to $5 \times 10^{-5}$ M fluorol 555 in toluene.

DESCRIPTION OF THE PREFERRED EMBODIMENT

The physical basis of the method of phase-resolved modulation Raman spectroscopy lies in the differeing temporal response of RS, fluorescence and thermal radiation to modulated excitation. The optical response of a sample to a short (delta function) pulse has an equivalent description in terms of the variation of the phase lag, $\phi$, and the modulated intensity of emitted light as a function of the modulation frequency, $\omega$, of the exciting light intensity. Each of the components of emission is considered in turn: (1) RS is, typically, an off-resonance instantaneous process and, hence, is in phase with the sinusoidally varying exciting light intensity. For resonant excitation a phase lag of RS may develop when $\omega > 1/T_2$, where $T_2$ is the dephasing time of the excited transition. This condition would limit the maximum modulation frequency that could be used to discriminate against fluorescence. However, since typically $T_2 << \tau$ where $\tau$ is the fluorescent lifetime in the case of a single exponential decay or some appropriate average for more complicated relaxation, it is generally possible to work with a condition $1/\tau << \omega << 1/T_2$, in which case RS can be resolved from fluorescence. (2) The fluorescent decay following pulse excitation leads to a small phase lag when $\omega << 1/\tau$. For larger modulation frequencies, such that $\omega >> 1/\tau$, the depth of fluorescence modulation decreases and the phase lag approaches 90°. For a single exponential decay, $\tan \phi = \omega\tau$ and the amplitude of fluorescence is proportional to $\cos \omega = (1+\omega^2\tau^2)^{-\frac{1}{2}}$. Therefore, using high frequency modulation and phase sensitive detection, set in quadrature with the fluorescence, the instrument will reject fluorescence while remaining sensitive to RS. (3) If the laser does not heat the sample, thermal radiation is constant in time and will not be detected. However, even if the laser does significantly heat the sample, the time for thermal diffusion and equilibration throughout the sample is much longer than modulation periods proposed here and so, for the reasons given above, thermal radiation will not be detected.

Figure 1:
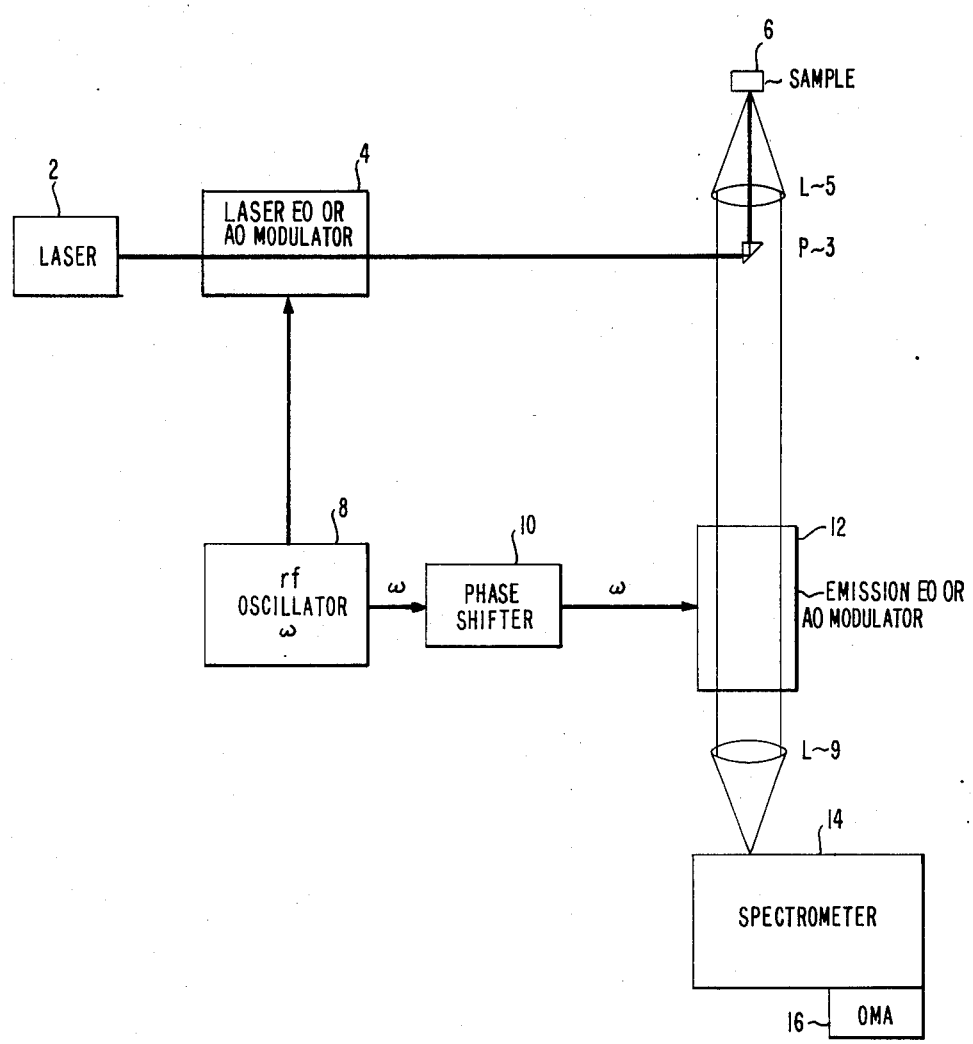
FIG. 1 is a schematic diagram showing the system of the present invention.

The preferred embodiment is shown schematically in FIG. 1. The intensity of a cw laser 2 is modulated by an optical modulator such as a Pockels cell and polarization analyzer. The modulated laser beam is directed to the sample 6 by prism 3. The scattered and emitted light from sample 6 is focused by lens 5 and is modulated by a second electro-optic modulator 12 before being focused by lens 9 and entering the spectrometer 14. The dispersed light falls on the OMA 16 and is detected. The first optical modulator 4 is driven by the rf oscillator 8 while the second optical modulator 12 is driven by the same rf oscillator 8 with adjustable phase relative to the first optical modulator 4 by phase shifter 10. The phase shift may be generated electronically as shown in FIG. 1 or may be accomplished by using a variable optical delay line between the laser optical modulator 4 and the sample 6.

Spectra are accumulated in two sequences with phase shifts of $\phi \pm \pi/2$ rad. between the first optical modulator 4 and the second optical modulator 12 and the difference spectrum is obtained. The unmodulated component of the fluorescence is detected identically in the two sequences regardless of the phase shift between the modulators and does not contribute to the difference spectrum. For a sample with a single fluorescence decay time, independent of optical emission frequency, $\phi$ is well defined. For symmetrical choice of phase shifts about $\phi$, the modulated component of fluorescence is the same in the two sequences. However, the RS is detected differently and the difference spectrum contains only RS without fluorescence. The statistical noise due to the fluorescence is still present in the phase-resolved difference spectrum and long integration times may be required to achieve acceptable signal to noise ratio in the presence of intense fluorescence.

For samples exhibiting multicomponent fluorescent decay, fluorescence may be effectively suppressed by modulating at high frequence such that $\omega\tau >> 1$. In this case the modulated components are reduced by $1/\omega\tau$; and the phase of the fluorescence approaches 90° so that they are all nearly in quadrature with the RS and may be cancelled together. Since light is demodulated by the emission modulator 12, the time response of the detector is not a factor and slow detection may be utilized. In addition an optical multichannel analyzer (OMA) 16 can be used as well as a single channel detector.

In a preferred embodiment of the present invention, the 4880 Å line of an Argon ion laser is used. The first optical modulator 4 is a Lasermetrics 3030 ADP Pockels cell polarizer and the second optical modulator 12 is an SLM LM200 Sears-Debye acousto-optic modulator. The light is dispersed in a Spex Triplemate spectrometer 14 and detected by a EG&G PAR 1420 intensified silicon photodiode array 16. The modulators 4 and 12 are driven at 15 MHz to produce optical intensity modulation with fundamental frequency of 30 MHz. A variable electrical bias is applied to the Pockels cell so that the optical transmission is nulled in the absence of RF to insure that the negative and positive going parts of the applied rf produce identical modulated transmission.

Figure 2:
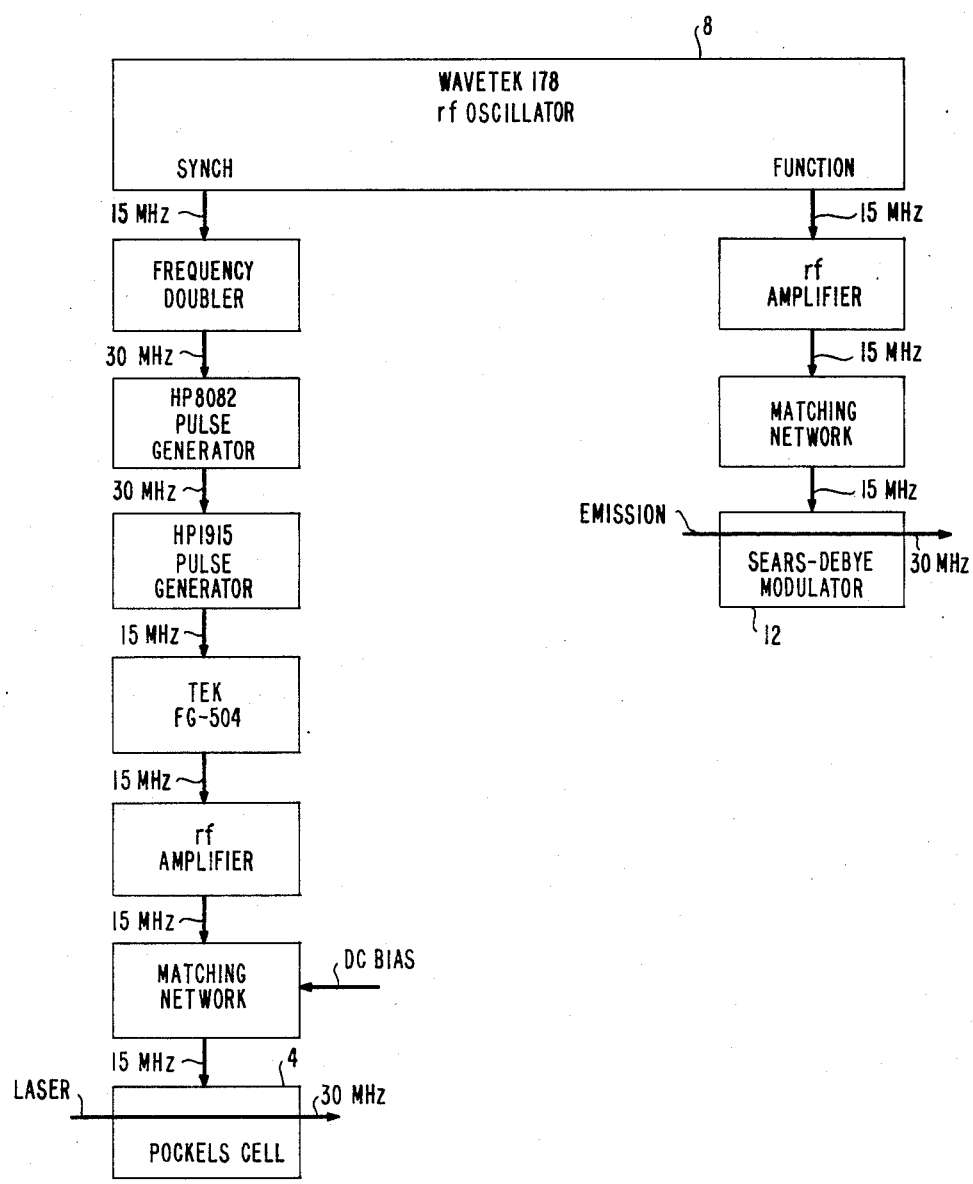
FIG. 2 is a schematic diagram showing the electronic arrangement of the present invention.

The electronic arrangement is shown in FIG. 2. The Pockels cell 4 is driven with 1W and the Sears-Debye modulator 12 with 10W of rf power. The phase delay between the modulators is set by the variable delay of the HP8082 pulse generator with a square wave output. A 180° phase shift between the two sequences is obtained by manually switching into the logically inverting mode for the pulse output. The phase delay is adjusted to give nearly equal fluorescence intensity in the two sequences. The HP1915 pulse generator produces a pulse slightly longer than the period of the 30 MHz modulation and serves to divide the frequency in half.

Figure 3A:
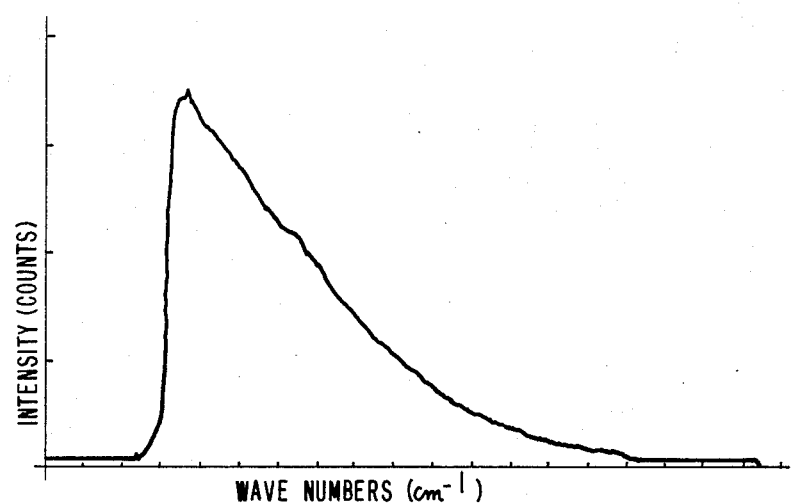
FIG. 3a shows the fluorescence from the sample with the two modulators set nearly in phase.
Figure 3B:
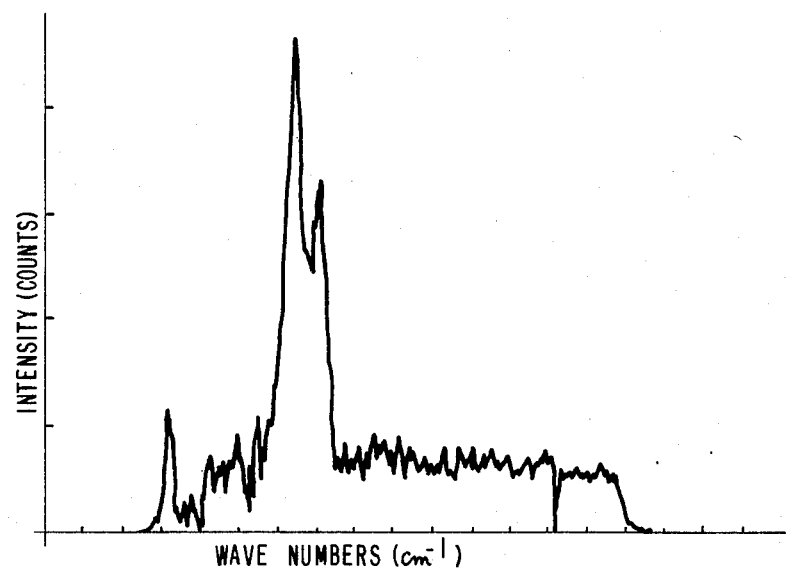
Figure 3C:
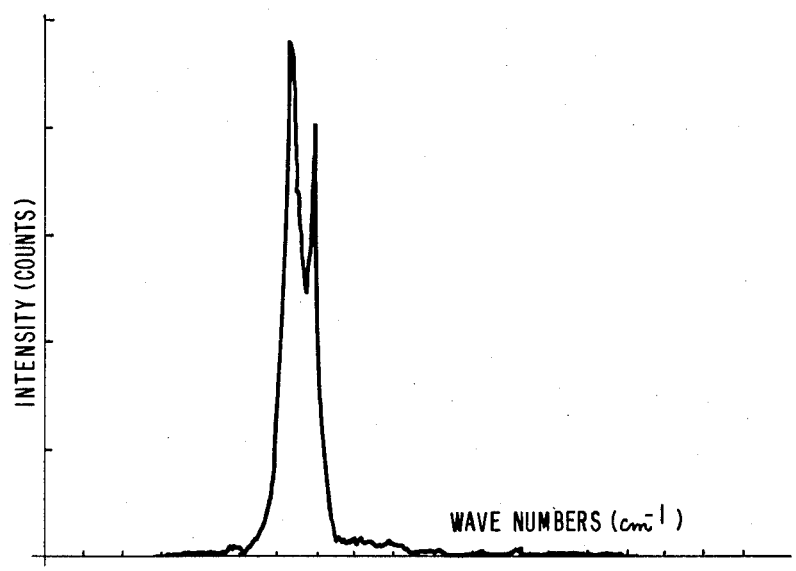
FIG. 3c shows the spectrum of neat cyclohexane taken under similar conditions.

Two examples in which a solvent Raman spectrum masked by fluorescence from dye molecules is revealed by phase-resolved modulation Raman scattering are given in FIGS. 3 and 4. FIG. 3a shows the fluorescence from $3 \times 10^{\times 4}$ M 2,2'-bipyridine ruthenous dichloride hexahydrate in a 70–30 mixture of cyclohexane and ethanol with the two modulators set nearly in phase. The decay time is measured to be 150 nsec using a first photon of arrival fluorescence decay technique. Subtracting the out of phase spectrum from the in phase spectrum shown in FIG. 3 reveals the CH stretching region of the spectrum as shown in FIG. 3b. The spectrum of neat cyclohexane taken under similar conditions is shown in FIG. 3c.

Figure 4A:
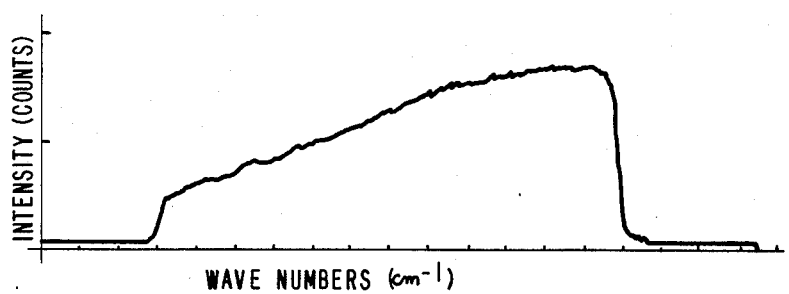
FIG. 4a shows the in phase spectrum taken with 35 mW of 4880 Å light with an integrating time of 100 sec.
Figure 4B:
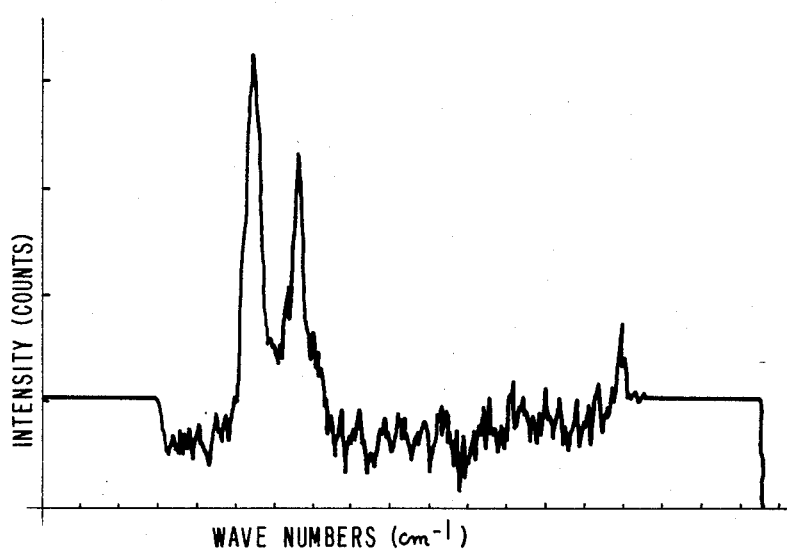
FIG. 4b shows the difference between the in and out of phase spectra.
Figure 4C:
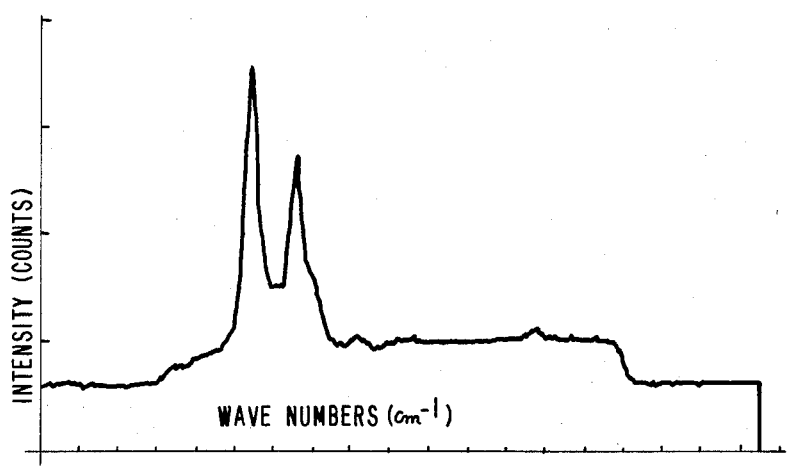
FIG. 4c shows the spectrum of neat toluene.

The application of phase-resolved modulation RS to $5 \times 10^{-5}$ M fluorol 555 in toluene is shown in FIG. 4. The in phase spectrum taken with 35 mW of 4880 Å light with an integrating time of 100 sec is shown in FIG. 4a. The difference between the in and out of phase spectra is shown in FIG. 4b and the spectrum of neat toluene is shown in FIG. 4c. The RS signal in this case is smaller than the pixel-to-pixel variation in sensitivity for the OMA tube, but this variation in sensitivity is suppressed in the difference spectrum.

What is claimed is:

1. A system for measuring fluorescencesuppressed Raman scattering from a sample comprising:
   (a) a continuous wave laser beam means, whose intensity is modulated by a first modulator said modulated beam striking said sample so as to produce fluorescent and Raman radiation, wherein said fluorescent radiation is out of phase with Raman radiation by the angle $\phi$;
   (b) an optical modulator means positioned so that said fluorescent and Raman radiation passes through a second modulator;
   (c) a phase shifter means for adjusting the phase of said second modulator by $\phi \pm \phi_o$ relative to said modulated laser beam where $\phi_o$ is an arbitrary phase;
   (d) spectrometer means for dispersing said radiation passing through said second modulator into spectra as a function of wavelength;
   (e) means for detecting said dispersed radiation, said spectra obtained at $\phi - \phi_o$ then being subtracted from said spectra obtained at $\phi + \phi_o$.

2. The system of claim 1 wherein said $\phi$ is substantially 90°.

3. The system of claim 1 wherein said detecting means is an optical multichannel analyzer.

4. The system of claim 1 wherein either of said modulators are electro or acousto optical modulators.

5. The system of claim 1 wherein either of said first and second modulator comprises a Pockels cell and a polarizer means.

6. The system of claim 1 wherein said detecting means is a slow detector that is unresponsive to the modulation frequency of said modulator means.

7. The system of claim 1 wherein the arbitrary angle is $\pi/2$.

* * * * *